June 18, 1940.　　　J. J. SINCLAIR ET AL　　　2,204,830
EMPTY AND LOAD BRAKE DEVICE
Filed Sept. 22, 1938　　2 Sheets-Sheet 1

INVENTORS
JOHN J. SINCLAIR
SAMUEL L. WILLIAMS
BY
ATTORNEY

June 18, 1940.  J. J. SINCLAIR ET AL  2,204,830
EMPTY AND LOAD BRAKE DEVICE
Filed Sept. 22, 1938  2 Sheets-Sheet 2

INVENTORS
JOHN J. SINCLAIR
SAMUEL L. WILLIAMS
BY
ATTORNEY

Patented June 18, 1940

2,204,830

UNITED STATES PATENT OFFICE 2,204,830

EMPTY AND LOAD BRAKE DEVICE

John J. Sinclair, Montclair, N. J., and Samuel L. Williams, New York, N. Y., assignors to The Westinghouse Air Brake Company, Wilmerding, Pa., a corporation of Pennsylvania Application September 22, 1938, Serial No. 231,188

26 Claims. (Cl. 303—22)

This invention relates to empty and load brake devices for vehicles, such as railway cars or trains, and has particular relation to empty and load brake devices wherein the adjustment according to load is effected periodically under the control of a vehicle door.

In the case of railway passenger cars employed for rapid transit service in metropolitan areas, the passenger load varies frequently and over wide limits. In order to maintain satisfactory schedules and provide adequate braking for all load conditions it is preferable that the permissible braking power be varied as the load varies. It is accordingly desirable to provide automatic means whereby the braking power is varied depending upon the load carried by a car in order to provide adequate braking for the higher loads without excessive braking at the lighter loads.

It is an object of our invention to provide a relatively simple mechanism adaptable to existing brake equipment on passenger cars for automatically varying the braking power depending upon the load carried by the car.

Another object of our invention is to provide an empty and load brake equipment of the type indicated in the foregoing object in which the adjustment of the brake equipment according to the load on the vehicle or car is effected under the control of the car doors while the vehicle or car is stopped.

The above objects, and other objects of our invention which will be made apparent hereinafter, are attained by several illustrative embodiments thereof subsequently to be described and shown in the accompanying drawings wherein.

Figure 1:
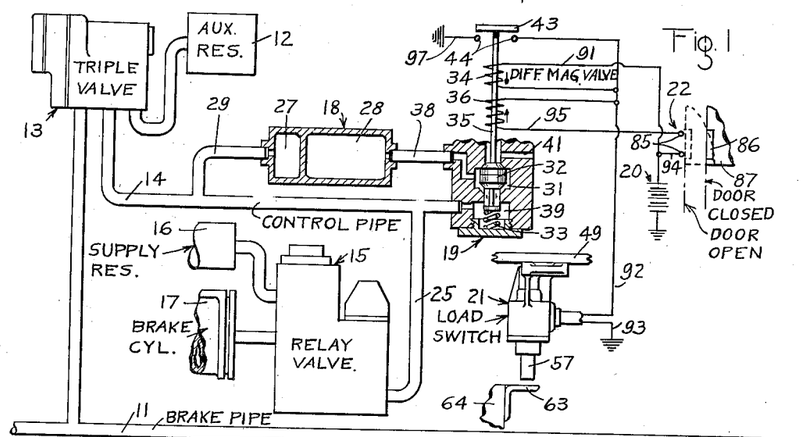
Fig. 1 is a diagrammatic view with certain parts in section, showing the essential parts of a brake equipment embodying our invention.

Embodiment shown in Fig. 1

Referring to Fig. 1, the equipment shown comprises a brake pipe 11, an auxiliary reservoir 12, a triple valve device 13 for controlling the supply of fluid under pressure from the auxiliary reservoir 12 to a control pipe 14 and its release therefrom, a relay valve device 15 controlled by the pressure in the control pipe 14 for controlling the supply of fluid under pressure from a supply reservoir 16 to a brake cylinder 17.

According to our invention, the equipment further comprises a two compartment volume reservoir 18, one or both of which compartments or chambers are adapted to be connected to the control pipe 14 under the control of a differential magnet valve device 19, a source of direct-current, such as a battery 20, which may be the usual battery employed on rapid transit cars for the entrance and exit door lights, a load-responsive switch device 21 and a door-controlled switch device 22, the switch devices 21 and 22 being arranged to control the supply of current from the battery 20 to the magnet windings of the magnet valve device 19.

Considering the parts of the equipment in greater detail, the brake pipe 11 may be charged to the normal pressure carried therein under the control of a conventional brake valve device not shown.

The triple valve device 13 may be of any conventional type having a piston-operated slide valve arranged to establish communication through which the auxiliary reservoir 12 is charged with fluid under pressure from the brake pipe 11 in response to an increase in pressure in the brake pipe 11, the control pipe 14 being simultaneously vented to atmosphere. As in the case of the conventional triple valve, the valve mechanism of the triple valve device 13 is operated in response to a reduction in brake pipe pressure at a service rate to supply fluid under pressure from the auxiliary reservoir 12 to the control pipe 14 at a service rate and upon a reduction of brake pipe pressure at an emergency rate to supply fluid under pressure from the auxiliary reservoir to the control pipe 14 at an emergency rate. The triple valve device 13 is operated to lap the supply of fluid under pressure from the auxiliary reservoir 12 to the control pipe 14 when the reduction of the pressure in the auxiliary reservoir corresponds substantially to the reduction in the brake pipe pressure. Thus, depending upon the degree of the reduction from the normal pressure carried in the brake pipe, varying quantities of fluid under pressure are supplied to the control pipe 14.

The relay valve device 15 is of the type described in detail and claimed in Patent No. 2,096,491, to Ellis E. Hewitt and is accordingly merely functionally described herein.

The relay valve device 15 is a supersensitive self-lapping valve mechanism having a piston chamber which is constantly connected to the control pipe 14 through a branch pipe 25. Upon the establishment of a certain fluid pressure in the control pipe 14, the relay valve device 15 is operative to cause fluid under pressure to be supplied from the supply reservoir 16 to the brake cylinder 17 to establish a pressure in the brake cylinder corresponding substantially to the pressure established in the control pipe 14. Upon reduction of the pressure in the control pipe 14 to atmospheric pressure, the relay valve device 15 operates to exhaust fluid under pressure from the brake cylinder 17 and thus effect the release of the brakes.

The volume reservoir 18 is preferably formed as an integral unit having two compartments or chambers 27 and 28 although separate reservoirs forming each of the chambers 27 and 28 may be employed. The chamber 27 of reservoir 18 is constantly connected to the control pipe 14, as through a branch pipe 29, and the chamber 28 is selectively connected to the control pipe 14 or to atmosphere under the control of the differential magnet valve device 19. The volume of chamber 28 may have any desired ratio to that of the chamber 27; for example, it may be two or three times the volume of the chamber 27.

The differential magnet valve device 19 is shown fragmentarily and diagrammatically as comprising a casing having a chamber 31 containing a double beat valve 32 which is urged upwardly into seated relation on an associated valve seat by a coil spring 33 and which is actuated downwardly into seated relation on a lower valve seat upon energization of an electromagnet winding or solenoid 34, through the medium of a stem 35 of the double beat valve that acts as a plunger for the solenoid 34. A second solenoid or electromagnet winding 36 is associated with the stem 35 in adjacent relation to the solenoid 34 and is effective when energized to exert a force on the stem 35 in opposition to the downward force exerted by the solenoid 34, as indicated by the arrows adjacent the solenoids.

The effect of the solenoid 36 when energized is to substantially balance or neutralize the force of the solenoid 34 on the stem 35, so that the spring 33 becomes effective to shift the double beat valve 32 to its upper seated position. Thus when the two solenoids 34 and 36 are both simultaneously energized or deenergized, the double beat valve 32 is shifted to its upper seated position.

The chamber 31 of the magnet valve device 19 is constantly connected to the chamber 28 of the reservoir 18 through a pipe and passage 38 so that when the double beat valve 32 is in its upper seated position as shown, it establishes communication from the chambers 28 and 31 to a chamber 39 to which the control pipe 14 is constantly connected. Thus, when fluid under pressure is supplied to pipe 14 it flows into volume chamber 28 of reservoir 18.

When the double beat valve 32 is in its lower seated position, communication between the chamber 28 and the control pipe 14 is closed and, simultaneously, a communication is open past the upper valve seat of the double beat valve from chamber 31 to atmosphere through an exhaust passage and port 41. Accordingly, when the double beat valve 32 is in its lower seated position, the volume chamber 28 is vented to atmosphere through the exhaust port 41.

Carried in insulated relation on the stem 35 is a contact-bridging member 43 which is adapted to engage a pair of spaced contact members 44, suitably mounted in insulated relation on the casing of the magnet valve device 19, when the double beat valve 32 is shifted to its lower seated position. When the double beat valve 32 is in its upper seated position, contact-bridging member 43 is correspondingly shifted so as to disengage the contact members 44. The purpose of the contact-bridging member 43 and the associated contact members 44 is to establish a holding circuit for maintaining the solenoid 34 of the magnet valve device 19 energized, which holding circuit will be presently described.

Figure 4:
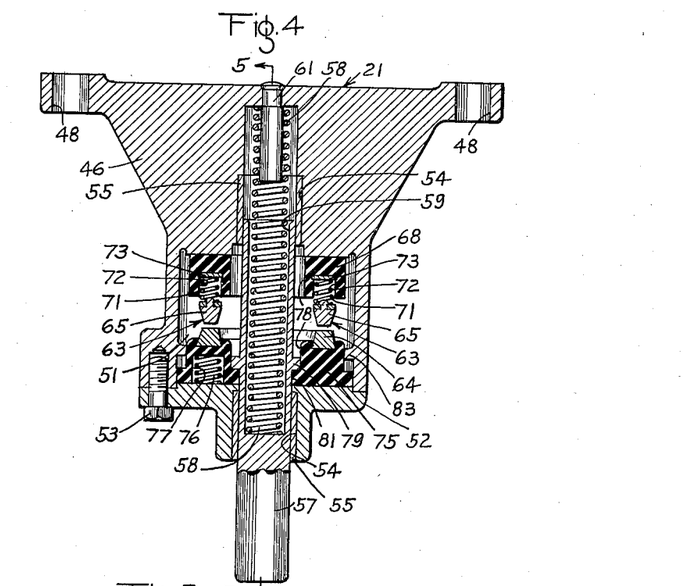
Fig. 4 is a vertical sectional view showing the details of the load-responsive switch device in Figs. 1, 2 and 3.
Figure 5:
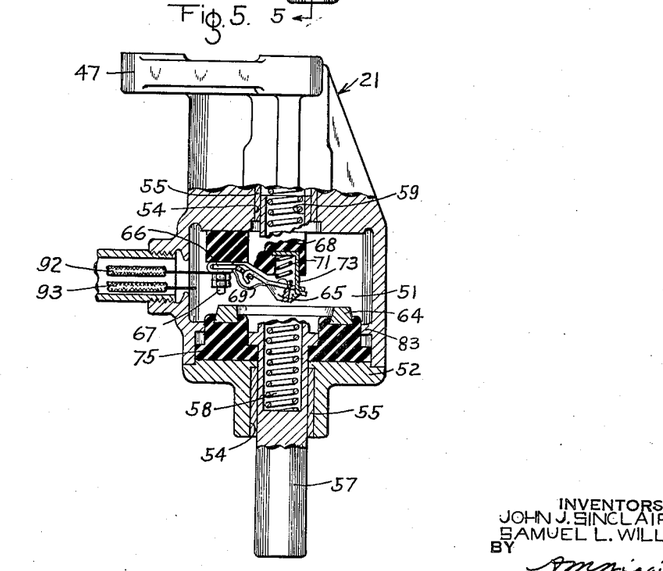
Fig. 5 is a sectional view, taken on the line 5—5 of Fig. 4.

Referring to Figs. 4 and 5, the load-responsive switch device 21 comprises a casing 46 having a flange 47 at the upper end thereof that is provided with a plurality of bolt holes 48 through which screws or bolts, not shown, may extend for securing the casing to a fixed part 49 of the car body.

Formed in the casing is a chamber 51, which is open at the lower end and covered by an end or cover plate 52 secured to the casing 21, as by one or more screws 53. Formed in the cover plate 52 and in the casing 21 are coaxially aligned bores 54 in which are received bushings 55 of suitable bearing material. A plunger 57 is arranged to slide vertically in the bushing 55 and is yieldingly urged downwardly to a limit position by a coil spring 58 which is interposed between the inner end of the plunger 57 and the upper end of the bore 54 in the casing 46. The inner end of the plunger 57 has a longitudinal bore or recess 59 for receiving and holding the lower end of the spring 58 and the upper end of the spring 58 is held against lateral movement by means of a pin 61 suitably secured to the casing and centrally disposed in the bore 54 in the casing.

The casing 46 of the load-responsive device 21 is so mounted on a sprung part of vehicle, such as the car body, that, as long as the load on the car does not exceed a certain degree, such as one-half of full load, the lower end of the plunger 57 remains above and out of contact with a projecting contact bracket 63 suitably secured to an unsprung part of the vehicle, such as a member 64 of the car truck. When the load on the car exceeds one-half of full load, the contact bracket 63 on the car truck engages the plunger 57 and causes upward movement of the plunger against the force of the spring 58. The upward movement of plunger 57, in turn, results in the engagement of a contact ring 64 with a pair of spaced contact members 63, contained in the chamber 51.

The contact members 63 are illustrated as of the type shown and claimed in Patent No. 2,055,114 to H. F. Woernley. Essentially, each of the contact members 63 comprises a contact element 65 hinged to a terminal element 66 that is secured as by a stud bolt or screw 67 to an insulating member 68 which is suitably fixed to the casing within the chamber 51. A suitable current-carrying shunt wire 69 is provided for by-passing the hinge joint between contact element 65 and the terminal element 66. The contact element 65 is yieldingly urged downwardly by a coil spring 71 which is received in a suitable recess 72 in the insulating member 68, the spring serving to hold in the recess a stop member 73 which limits the downward movement of the contact element.

The contact ring 64 is suitably secured in the upper face of an annular insulating member 75 which slides vertically in the chamber 51 and is yieldingly urged upwardly by a plurality of coil springs 76 contained in suitable recesses 77 in the lower face of the annular insulating member and interposed between the insulating member and the cover plate 52.

The insulating members 68 and 75 have aligned central openings 78, through which the plunger 57 extends, and the plunger 57 has an annular shoulder 79 thereon which engages an annular shoulder 81 in the opening 78 of insulating member 75 to force the insulating member 75 normally downwardly into engagement with the cover plate 52 in response to the force of the spring 58, which is stronger than that of springs 76.

When the plunger 57 is moved upwardly by contact with the bracket 63 on the car truck, the springs 76 shift the annular insulating member 75 upwardly to effect engagement of the contact ring 64 with the contact elements 65 of the spaced contact members 63 to thereby effect the closing of a circuit presently to be described.

The casing 46 has formed thereon an annular shoulder 83 which projects into the chamber 51 to limit the upward movement of the annular insulating member 75 in response to the force of the springs 76. It will thus be seen that the force with which the contact ring 64 is pressed to the contact elements 65 is limited to the force of springs 76, regardless of the degree of load on the car truck above one-half load.

The door-operated switch device 22 is illustrated in diagrammatic form as comprising a pair of stationary contact members 85 adapted to be connected in bridged relation by a contact element 86, carried on the car door 87, when the car door is shifted to open position.

The circuits for energizing the solenoids 34 and 36 of the magnet valve device 19 are controlled by the load-responsive switch device 21, the door switch device 22 and the contact member 43 of the magnet valve device 19, and will be described in detail hereinafter.

*Operation of embodiment shown in Fig. 1*

Let it be assumed that the brake pipe 11 is charged to the normal pressure carried therein in conventional manner under the control of a brake valve device, that the triple valve device 13 is operatively conditioned in response to the normal pressure in the brake pipe to effect charging of the auxiliary reservoir 12 to the pressure carried in the brake pipe, that the supply reservoir 16 is charged with fluid under pressure in any suitable manner, that the car or train of cars is traveling along the road under power, and that the car truck with which the load-responsive switch device 21 is associated carries less than one-half load. Under the circumstances, the control pipe 14 is vented to atmosphere by the triple valve device 13 and the relay valve device 15 is operatively conditioned to exhaust fluid under pressure from the brake cylinder 17 so that the brakes are released. Furthermore, with the car in motion under power, the car door 87 is in closed position, and with less than one-half load on the car truck, the load-responsive switch device 21 is in open position.

As will be presently made apparent, the solenoids 34 and 36 of magnet valve device 19 are both deenergized under the condition assumed, and accordingly magnet valve 19 connects the chamber 28 in the reservoir 18 to the control pipe 14.

If, with the equipment conditioned as just described, it is desired to effect an application of the brakes, the operator effects a reduction of the pressure in the brake pipe 11 in the usual manner by operation of the brake valve device, not shown. The triple valve device 13 accordingly operates, in well-known manner, in response to the reduction of the pressure in the brake pipe 11 to cause fluid under pressure to be supplied from the auxiliary reservoir 12 into the control pipe 14, fluid under pressure being withdrawn or supplied from the auxiliary reservoir 12 until the pressure in the auxiliary reservoir is reduced an amount substantially equal to the amount of the reduction in the brake pipe pressure. It will thus be observed that for a given amount of reduction in brake pipe pressure from the normal pressure carried therein a given quantity of fluid under pressure is always withdrawn from the auxiliary reservoir 12 and supplied into the control pipe 14. This should be borne in mind in connection with subsequent operation of the equipment.

With both the chambers 27 and 28 connected to the control pipe 14, the quantity of fluid under pressure supplied into the control pipe 14 results in a certain pressure being established in the piston chamber of the relay valve device 15, which is accordingly operated to supply fluid under pressure from the supply reservoir 16 to the brake cylinder 17, the degree of pressure established in the brake cylinder 17 corresponding substantially to the pressure established in the piston chamber of the relay valve device. It will thus be seen that under the circumstances assumed, a brake application corresponding to the degree of reduction in brake pipe pressure 11 is effected.

If it is desired to graduate the application, the operator may make successive reductions in the brake pipe pressure so that the pressure in the control pipe 14 and in the piston chamber of the relay valve device 15 is correspondingly increased for each successive reduction of brake pipe pressure.

If, having effected a desired degree of brake application, the operator desires to graduate the release of the brakes as the car or train decreases in speed in coming to a stop, in order to prevent excessive application of the brakes at the lower speeds, he may do so by increasing the pressure in the brake pipe 11 in successive steps. The triple valve device 13 thus operates successively to recharge the auxiliary reservoir 12 to the increased pressure in the brake pipe 11 and effects a corresponding reduction of the pressure in the control pipe 14 and piston chamber of the relay valve device 15 so that the relay valve device 15 operates successively to reduce the pressure in the brake cylinder 17.

If the operator desires to release the brakes prior to again starting the car or train, he restores the pressure in the brake pipe 11 to its normal pressure and thus triple valve 13 operates to recharge the auxiliary reservoir 12 to the normal pressure carried therein and to vent the control pipe 14 to atmosphere. The pressure in the piston chamber of the relay valve device 15 is thus correspondingly reduced to atmospheric pressure and accordingly fluid under pressure is exhausted from the brake cylinder 17 to effect a release of the brakes.

If the load on the car is not increased above one-half load while the car is stopped to take on or discharge passengers, the opening of the car door 87 is without effect as far as the magnet valve device 19 is concerned. However, if while the care or train is stopped and the car door 87 in open position, the influx of passenger load is such as to increase the load on the car above one-half load, the load-responsive switch device 21 is actuated to closed position and a circuit is accordingly established for simultaneously energizing the two solenoids 34 and 36 of the magnet valve device 19. The circuit for the solenoid 34 extends from the positive terminal of the battery 20 through a wire 91, solenoid coil 34, a wire 92, one of the contact members 63 of the load-responsive switch device 21, contact ring 64, the other contact member 63, and thence to the negative terminal of the battery 20 as through a ground connection including a wire 93 connecting the last mentioned contact member 63 to ground.

The circuit of the solenoid 36 extends from the positive terminal of the battery 20 through wire 91, a branch wire 94, door switch 22, a wire 95, solenoid 36 and thence through wire 92, load-responsive switch device 21 and wire 93 to the negative terminal of the battery 20 as traced for the solenoid 34.

Since the solenoids 34 and 36, when energized, produce substantially equal and opposite forces on the stem 35 of the magnet valve device 19, it will be seen that no operation of the magnet valve device 19 is effected upon the simultaneous energization of the two solenoids 34 and 36. When the door of the car is shifted to closed position again, however, prior to starting the car, the circuit for energizing the solenoid 36 is interrupted at the door switch 22 and thus only the solenoid 34 remains energized. Accordingly, the double beat valve 32 of the magnet valve device 19 is shifted to its lower seated position cutting off the connection between the chamber 28 of the reservoir 18 and the control pipe 14 and simultaneously establishing communication for venting fluid under pressure from the chamber 28. The engagement of the contact member 43 on the stem 35 of the magnet valve device 19 with its associated contact members 44, when the double beat valve 32 is in its lower seated position, establishes a holding circuit for the solenoid 34 which extends from the positive terminal of the battery 20 through wire 91, solenoid 34, wire 92, contact members 44 and 43 of the magnet valve device 19, and thence to the negative terminal of the battery 20 as by a wire 97 connecting the last one of the contact members 44 to ground.

It will be apparent that the solenoid 34 is thus maintained energized to insure that the chamber 28 remains disconnected from the control pipe 14 regardless of the momentary and undesired opening of the load-responsive switch 21 as a result of possible shocks, jars or bouncing of the car incident to travel along the road.

Bearing in mind that only the chamber 27 of the reservoir 18 is now connected to control pipe 14, a subsequent application of the brakes may be effected by reducing the pressure in the brake pipe 11 in the manner previously described. However, since the volume of chamber 27 is only a fraction of the original combined volume of the two chambers 27 and 28, it will be apparent that a given quantity of fluid under pressure delivered from the auxiliary reservoir into the control pipe 17 in response to a given reduction in the brake pipe pressure will produce a higher resultant pressure in the piston chamber of relay valve device 15, as compared to the resultant pressure when both the chambers 27 and 28 are connected to the control pipe 18.

Thus, the relay valve device 15 operates in response to the higher pressure established in the control pipe 14 to establish a higher pressure in the brake cylinder 17 for a load on the car in excess of one-half load, as compared to the pressure established in the brake cylinder when the load on the car is less than one-half load.

As in the case of application of the brakes with the car carrying less than one-half load, the operator may in this case also graduate the application and the release of the brakes by successively decreasing and increasing the pressure in the brake pipe 11.

When the car or train is brought to a stop in response to the application of the brakes and the car door 87 is again opened to permit the discharge or influx of passengers, the solenoid 36 of the magnet valve device 19 is again energized due to the completion of the energizing circuit therefor previously described. With both of the solenoids 34 and 36 again energized, the spring 33 shifts the double beat valve 32 to its upper seated position, thereby reconnecting the chamber 28 of the reservoir 18 to the control pipe 14. The pressure in the control pipe 14 and piston chamber of the relay 15 is accordingly reduced due to the flow of fluid under pressure from the control pipe 14 into the chamber 28. The brake cylinder pressure is thus reduced by operation of the relay valve 15 but the amount of the reduction in the degree of the application is not objectionable because the operator may vary the degree of reduction in brake pipe pressure 11 as desired to effect a sufficient degree of brake application to insure holding the car or train against creepage.

If the change in passenger load at the stop is not such as to cause opening of the load-responsive device 21, then, upon the subsequent closing of the car door 87 and deenergization of the solenoid 36, the solenoid 34 which remains energized causes the double beat valve 32 to be shifted to its lower seated position to again cut off the chamber 28 from the control pipe 14. However, if the change in passenger load during the stop is such as to cause opening of the load-responsive switch 21, the solenoid 34 is deenergized. Thus upon the subsequent closing of the car door and the deenergization of the solenoid 36, both of the solenoids 34 and 36 are deenergized. Accordingly, spring 33 holds the double beat valve 32 of the magnet valve device 19 in its upper seated position to maintain the chamber 28 connected to the control pipe 14 so that upon subsequent application of the brakes the degree of brake application for a given reduction of brake pipe pressure will be that for a load less than one-half load.

Figure 2:
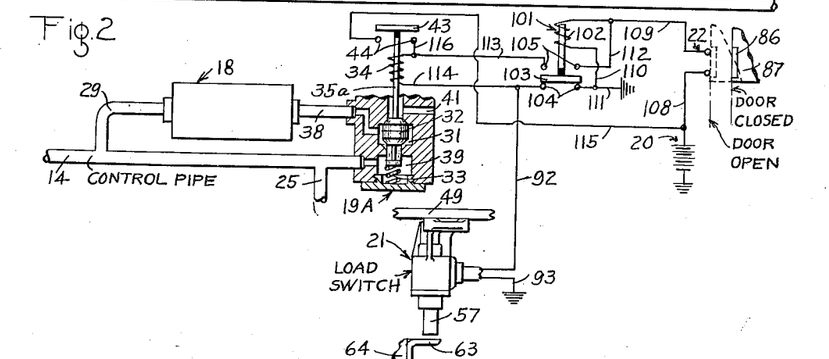
Figs. 2 and 3 are fragmentary diagrammatic views illustrating two different modifications of the embodiment shown in Fig. 1.

*Embodiment shown in Fig. 2*

Referring to Fig. 2, the embodiment shown therein differs from the embodiment shown in Fig. 1 in having a magnet valve device 19A instead of the magnet valve device 19 and in having an additional electromagnetically operable relay or switch device 101 whereby the control of the connection between the chamber 28 of the reservoir 18 and the control pipe 14 is effected in a different manner.

The magnet valve device 19A differs from the magnet valve device 19 in not having the solenoid 36 and also in having an operating stem 35a, corresponding to the stem 35 of the magnet valve 19, which is shorter than the stem 35 in view of the omission of the solenoid 36. In other respects, the magnet valve device 19A is identical with the magnet valve device 19 and corresponding parts in the two magnet valve devices are designated by the same reference numerals.

The relay 101 is a conventional relay of standard type and is illustrated diagrammatically as comprising an electro-magnet winding 102 effective when energized to actuate a contact member 103 out of engagement with a pair of spaced contact members 104 into engagement with a pair of spaced contact members 105, the contact member 103 being returned into engagement with the contact members 104 and disengaged from the contact members 105 by gravity or a biasing means, not shown, upon deenergization of the magnet winding 102.

When the car door 87 is shifted to its open position, the consequent closing of the door switch 22 establishes a circuit for energizing the magnet winding 102 of the relay 101, which circuit extends from the positive terminal of the battery 20 through a wire 108, the door switch 22, a wire 109, magnet winding 102 of relay 101, wires 110 and 111, and back to the negative terminal of the battery 20 through a ground connection as shown.

The engagement of the contact member 103 of the relay 101 with the contact members 105 completes a circuit for energizing the solenoid 34 of the magnet valve device 19A if the load-responsive switch device 21 is in closed position. This circuit extends from the positive terminal of the battery 20 through wire 108, door switch 22, wire 109, a branch wire 112, contact members 105 and 103 of the relay 101, a wire 113, solenoid 34, a wire 114, and thence to the negative terminal of the battery 20 through wires 92, load-responsive switch 21 and wire 93, as in Fig. 1.

As in the case of the magnet valve 19, the energization of the solenoid 34 of the magnet valve 19A causes the double beat valve 32 to be shifted to its lower seated position and the contact member 43 to be shifted into engagement with the contact members 44. The engagement of the contact member 43 with its associated contact members 44 establishes a holding circuit for the solenoid 34 which extends from the positive terminal of the battery 20 through wire 108, a branch wire 115, contact members 44 and 43 of the magnet valve 19A, a branch wire 116, wire 113, solenoid 34, wire 114, and thence to the negative terminal of the battery 20 by way of the wire 92, load-responsive switch 21 and wire 93. Thus, once the solenoid 34 is energized in response to the opening of the car door, the solenoid 34 is maintained energized thereafter as long as the load on the car or car truck is sufficient to maintain the load responsive switch device 21 closed.

Upon the closing of the car door 87, the circuit for energizing the magnet winding 102 of the relay 101 is interrupted. Consequently, the contact member 103 disengages the contact members 105 and reengages the contact members 104. Since the holding circuit established by the contact member 43 of the magnet valve device 19A maintains the solenoid 34 energized, the disengagement of the contact member 103 from the contact members 105 does not effect deenergization of the solenoid 34. Furthermore, the engagement of the contact member 103 with its contact members 104 establishes a shunt connection to ground around the load-responsive switch device 21, so that with the car door closed the holding circuit for solenoid 34 is maintained independently of the load-responsive switch device. Accordingly, if the car or train is traveling along the road with a load slightly exceeding one-half load, shock and jars or bouncing of the car resulting in momentary opening of the load-responsive switch 21 will not effect deenergization of the solenoid 34.

If the load-responsive switch 21 is open, the closing of the door switch 22 due to opening of the car door is ineffective to cause energization of the solenoid 34 of the magnet valve device 19A because the circuit for initially energizing the solenoid cannot be established except through the load-responsive switch 21. Likewise, with the door closed and the door switch 22 correspondingly in open position, the accidental closing of the load-responsive switch 21 due to the bouncing of the car during travel along the road is ineffective to cause energization of the solenoid 34. The last-mentioned feature is not present in the embodiment shown in Fig. 1. In Fig. 1, accidental closing of the load-responsive switch 21 will effect energization of the solenoid 34 of the magnet valve device 19 and the holding circuit, established by contact member 43, will thereafter be maintained even though the load-responsive switch subsequently opens. Thus, in Fig. 1, when the load on the car is slightly under that required to cause closing of the load-responsive switch 21, it is possible that the magnet valve 19 be operated to cut off the chamber 28 of the reservoir 18 from the control pipe 14 even though the load on the car is slightly less than one-half load. However, such fact is not necessarily objectionable as the load is close to one-half load.

It will thus be seen that if the load-responsive switch 21 is open, the magnet valve device 19A will be conditioned to connect the chamber 28 of reservoir 18 to the control pipe 14. As long as the load-responsive switch 21 remains open, the chamber 28 will remain connected to the pipe 14 notwithstanding the opening of the car door. If the load-responsive switch changes from open to closed position while the car door is open, the solenoid 34 of the magnet valve 19A will be energized and chamber 28 disconnected from pipe 14 and vented to atmosphere. Furthermore, chamber 28 will be maintained disconnected from pipe 14, regardless of opening or closing the car door, as long as the load-responsive switch remains closed. Also, accidental opening of the load-responsive switch 21 while the car door is closed will not result in the connection of chamber 28 to the control pipe; and accidental closing of the load-responsive switch 21 while the door is closed will not result in disconnection of the chamber 28 from the control pipe 14.

It is believed unnecessary to further describe the operation of the embodiment shown in Fig. 2 in view of the detailed description of the operation in Fig. 1 and the description of the control circuits given for Fig. 2, from which the operation of the embodiment shown in Fig. 2 should be understood.

Figure 3:
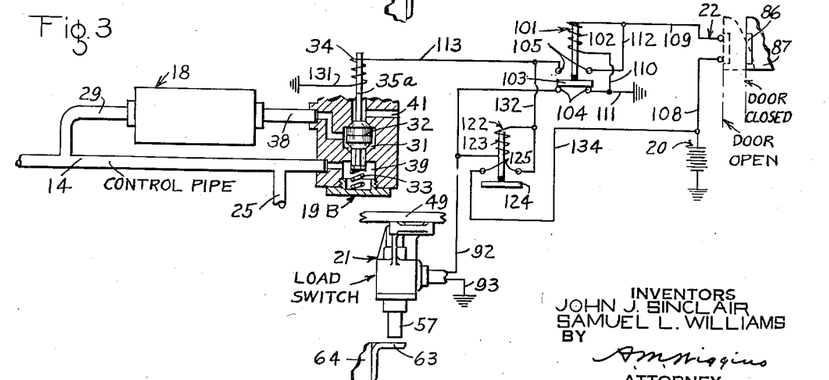

*Embodiment shown in Fig. 3*

Referring to Fig. 3, the embodiment shown differs from that in Fig. 2 in the provision of a magnet valve device 19B instead of the magnet valve 19A and in the addition of an electromagnetically operated relay 122.

The magnet valve device 19B differs from the magnet valve device 19A in not having the holding circuit contact member 43 and its associated contact members 44. In other respects, the magnet valve 19B is identical to the magnet valve 19A and corresponding parts are designated by the same reference numerals.

The relay 122 is a conventional type relay having an electromagnet winding 123 which is effective when energized to cause a movable contact member 124 to engage a pair of stationary contact members 125, the contact member 124 being biased out of engagement with its associated contact members 125 by gravity or by spring means, not shown, upon deenergization of the magnet winding 123.

The relay 101 is controlled by the door switch 22 in identically the same manner as in Fig. 2, that is, when the car door 87 is in open position, the magnet winding 102 is energized and the contact member 103 of the relay 101 is shifted out of contact with its associated pair of contact members 104 and into contact with its associated pair of contact members 105. The engagement of contact member 103 of relay 101 with the contact members 105 establishes a circuit for energizing the solenoid 34 of the magnet valve device 19B, which circuit extends from the positive terminal of the battery 20 by way of the wire 108, door switch 22, wire 109, branch wire 112, contact members 103 and 105 of the relay 101, wire 113, solenoid 34, a wire 131 and through ground back to the negative terminal of the battery. Accordingly, accidental closure of the load-responsive switch 21 while the car door is closed, cannot result in undesired energization of solenoid 34.

If the load-responsive switch device 21 is closed when the contact member 103 of the relay 101 is shifted into engagement with the contact members 105, a circuit is completed for energizing the magnet winding 123 of the relay 122. This circuit extends from the positive terminal of the battery 20 to the wire 113 as described for the solenoid 34 and thence by a branch wire 132, magnet winding 123 to the wire 92, and thence to the negative terminal of the battery 20 through the load-responsive switch device 21, wire 93 and the ground connection shown.

The engagement of the contact member 124 of the relay 122 with the contact members 125, as a result of the energization of the magnet winding 123 completes a holding circuit for maintaining the magnet winding 123 and the solenoid 34 of the magnet valve device 19B energized.

The holding circuit for magnet winding 123 extends from the positive terminal of battery 20 through wire 108, a branch wire 134, contact members 125 and 124 of relay 122, branch wire 132, magnet winding 123, wire 92, load-responsive switch device 21, wire 93, and through ground back to the negative terminal of the battery. The holding circuit for the solenoid 34 of magnet valve device 19B extends from the positive terminal of battery 20 to wire 132 as just traced and thence by way of wire 113, solenoid 34, wire 131, and through ground to the negative terminal of the battery.

Due to the establishment of the holding circuits just described, the subsequent closing of the car door 87 and consequent disengagement of the contact member 103 of the relay 101 from the contact members 105 is ineffective to cause deenergization of the magnet winding 123 and solenoid 34. At the same time, the engagement of the contact member 103 of the relay 101 with its associated contact members 104 establishes a circuit to ground from wire 92, connected to one terminal of the magnet winding 123 of the relay 122, in shunt relation to the load-responsive switch 21 so that, when the door 87 is closed, the accidental or unintentional opening of the load-responsive switch 21 due to shock or bouncing of the car is ineffective to cause deenergization of the solenoid 34 of the magnet valve device 19B, because the holding circuit for the magnet winding 123 of the relay 122 is maintained.

It will thus be seen that, in the embodiment shown in Fig. 3, the double beat valve 32 of the magnet valve device 19B is shifted to its lower seated position by energization of the solenoid 34 to disconnect the chamber 28 from the control pipe 14 every time the car door 87 is shifted to open position, unless it is already in such position due to the holding circuit for the solenoid 34 being established. Also, it will be seen that when the car door 87 is shifted to closed position prior to again starting the car, solenoid 34 of the magnet valve device 19B remains energized, or is deenergized, depending upon whether the load-responsive switch 21 is closed or open, respectively, that is, if the load-responsive switch 21 is closed, as it is for a load on the car in excess of one-half load, the magnet valve device 19B remains condiitoned to cut the chamber 28 of the reservoir 18 off from the control pipe 14 when the car door is closed; and if the load-responsive switch 21 is open, the closing of the car door 87 effects operation of the magnet valve device 19B to restore the connection between the chamber 28 and the control pipe 14.

If desired, the grounding wire 131 for the solenoid 34 in Fig. 3 may be connected to the wire 92, instead of directly to ground. In such case the control of solenoid 34 is the same as in Fig. 2, namely, that solenoid 34 is energized by opening of the door 87 only in the event that the load-responsive switch 21 is closed or becomes closed. Thus, the solenoid 34 will not be energized to cause the chamber 28 to be disconnected from the control pipe every time the door is opened while the load is less than one-half load.

In view of the complete description of the operation given in connection with Fig. 1 and in view of the above description of the control circuits for the embodiment shown in Fig. 3, a detailed description of the operation of the equipment shown in Fig. 3 is deemed unnecessary.

*Summary*

Summarizing, it will be seen that we have disclosed three embodiments of a brake equipment having relatively simple means for conditioning the equipment to effect a lower or a higher degree of brake application for a given reduction in brake pipe pressure, depending upon the load carried by a car or car truck being below or above a certain uniform value.

Generally speaking, all of the arrangements provide a plurality of volume reservoirs one or more of which are selectively connectible to a control pipe and correspondingly vary the pressure established therein by the supply of a given amount of fluid under pressure corresponding to a given reduction in brake pipe pressure. The selective connection of the volume reservoirs to the control pipe is effected under the joint control of a load-responsive switch device and a door switch device.

Our invention is of particular advantage and utility in connection with the provision of an empty and load feature on existing brake equipments not provided with such feature inasmuch as only a relatively few number of additional parts are required which may be installed and connected in the system with relatively small effort and expense.

While we have disclosed only several embodiments of our invention, it will be apparent that various omissions, additions, or modifications may be made in the embodiments shown without departing from the spirit of our invention. It is accordingly not our intention to limit the scope of our invention except as it is necessitated by the scope of the prior art.

Having now described our invention, what we claim as new and desire to secure by Letters Patent, is:

1. A vehicle brake equipment comprising a fluid pressure operated valve device operative according to the pressure of the operating fluid to control the degree of application of the brakes, means for causing a given quantity of fluid under pressure to be supplied to said valve device to effect operation thereof, means providing a plurality of chambers each of constant volume, and means operative to selectively render one or more of said chambers effective, during application of the brakes, to receive fluid under pressure supplied to operate the valve means to vary the pressure of the operating fluid for said given quantity to thereby vary the degree of application of the brakes.

2. A vehicle brake equipment comprising valve means operative according to the pressure of an operating fluid supplied thereto to establish a corresponding degree of application of the brakes, means providing a chamber, a magnet valve device for selectively rendering said chamber effective or non-effective to receive fluid under pressure supplied to operate the valve means whereby to vary the effective pressure of a given quantity of fluid supplied to operate the valve means, switch means operated in response to variations of the load on the vehicle, and switch means operated in response to movement of a vehicle door, said load-responsive switch means and door-controlled switch means being jointly effective to control the said magnet valve device.

3. A vehicle brake equipment comprising valve means operative according to the pressure of an operating fluid supplied thereto to establish a corresponding degree of application of the brakes, means providing a chamber, a differential magnet valve device having two opposing windings and effective upon energization of one only of said windings to render said chamber non-effective to receive fluid under pressure supplied to operate the valve means and upon simultaneous energization or simultaneous deenergization of both of said windings to render the said chamber effective to receive fluid under pressure supplied to operate the valve means whereby to vary the effective pressure of the operating fluid for a given quantity supplied to operate the valve means.

4. A vehicle brake equipment comprising fluid pressure operated valve means effective according to the pressure of the operating fluid supplied thereto to establish a corresponding degree of application of the brakes, means for varying the effective volume of the operating chamber of the valve means whereby to vary the effective pressure of the operating fluid for a given quantity of fluid under pressure supplied to operate the valve means, said last means including a differential magnet valve device having two windings and effective when one only of said windings is energized to decrease the volume receiving the fluid under pressure and when both said windings are simultaneously energized or deenergized to increase the receiving volume.

5. A vehicle brake equipment comprising valve means operative according to the pressure of fluid supplied thereto to establish corresponding degrees of application of the brakes, means providing a chamber, and a differential magnet valve device having two opposing windings and effective when one only of said windings is energized to render said chamber ineffective to receive fluid under pressure supplied to operate the valve means and effective when both said windings are simultaneously energized or deenergized to render said chamber effective to receive fluid under pressure supplied to operate the valve means whereby to vary the volume receiving a given quantity of fluid under pressure supplied to operate the valve means and thereby vary the effective pressure for operating the valve means.

6. A vehicle brake equipment comprising valve means operative according to the pressure of fluid supplied thereto to establish corresponding degrees of application of the brakes, means providing a chamber, a differential magnet valve device having two opposing windings and effective when one only of said windings is energized to render said chamber ineffective to receive fluid under pressure supplied to operate the valve means and effective when both said windings are simultaneously energized or deenergized to render said chamber effective to receive fluid under pressure supplied to operate the valve means whereby to vary the volume receiving a given quantity of fluid under pressure supplied to operate the valve means and thereby vary the effective pressure for operating the valve means, means controlled according to the load on the vehicle for controlling energization of said one winding, and door controlled means for controlling energization of the other winding.

7. A vehicle brake equipment comprising valve means operative according to the pressure of an operating fluid supplied thereto to effect a corresponding degree of application of the brakes, means for supplying a given quantity of fluid under pressure to operate the valve means, means providing a chamber, and a differential magnet valve device having two opposing windings and effective when both of said windings are energized or deenergized to render the said chamber effective to receive fluid under pressure delivered to operate the valve means and operative when one only of said windings is energized to render the said chamber non-effective to receive fluid under pressure supplied to operate the valve means whereby to vary the effective pressure of a given quantity of fluid under pressure supplied to operate the valve means.

8. A vehicle brake equipment comprising valve means operative according to the pressure of an operating fluid supplied thereto to effect a corresponding degree of application of the brakes, means for supplying a given quantity of fluid under pressure to operate the valve means, means providing a chamber, a differential magnet valve device having two opposing windings and effective when both of said windings are energized or deenergized to render the said chamber effective to receive fluid under pressure delivered to operate the valve means and operative when one only of said windings is energized to render the said chamber non-effective to receive fluid under pressure supplied to operate the valve means whereby to vary the effective pressure of a given quantity of fluid under pressure supplied to operate the valve means, means responsive to the load on the vehicle for effecting energization of said one of the windings when the load on the vehicle exceeds a certain degree, and door controlled means operative to effect energization of the other of said windings.

9. A vehicle brake equipment comprising valve means operative according to the pressure of an operating fluid supplied thereto to effect a corresponding degree of application of the brakes, means for supplying a given quantity of fluid under pressure to operate the valve means, means providing a chamber, a differential magnet valve device having two opposing windings and effective when both of said windings are energized or deenergized to render the said chamber effective to receive fluid under pressure delivered to operate the valve means and operative when one only of said windings is energized to render the said chamber non-effective to receive fluid under pressure supplied to operate the valve means whereby to vary the effective pressure of a given quantity of fluid under pressure supplied to operate the valve means, means responsive to the load on the vehicle for effecting energization of said one winding when the load on the vehicle exceeds a certain degree, means effective once said one winding is energized for thereafter maintaining it energized independently of the load-responsive means, and manually controlled means for effecting energization of the other of said windings to render non-effective said means for maintaining said one winding energized.

10. A vehicle brake equipment comprising valve means operative according to the pressure of an operating fluid supplied thereto to effect a corresponding degree of application of the brakes, means for supplying a given quantity of fluid under pressure to operate the valve means, means providing a chamber, a differential magnet valve device having two opposing windings and effective when both of said windings are energized or deenergized to render the said chamber effective to receive fluid undr pressure delivered to operate the valve means and operative when one only of said windings is energized to render the said chamber non-effective to receive fluid under pressure supplied to operate the valve means whereby to vary the effective pressure of a given quantity of fluid under pressure supplied to operate the valve means, means responsive to the load on the vehicle for effecting energization of said one winding when the load on the vehicle exceeds a certain degree, means effective once said one winding is energized for thereafter maintaining it energized independently of the load-responsive means, and means controlled by the position of a vehicle door for controlling energization of the other of said windings.

11. A vehicle brake system comprising valve means operative according to the pressure of fluid supplied thereto to effect an application of the brakes to a degree corresponding to the operating pressure, means providing a chamber, a magnet valve device having a winding and effective when said winding is energized to render said chamber non-effective to receive fluid under pressure supplied to operate the valve means and when said winding is deenergized to render the said chamber effective to receive fluid under pressure supplied to operate the valve means, means actuated in response to the relative movment between sprung and unsprung portions of the vehicle for effecting energization of said winding, and means effective when said winding is once energized to thereafter maintain said winding energized to prevent deenergization thereof due to undesired operation of the means responsive to relative movement of the sprung and unsprung portions of the vehicle.

12. A vehicle brake system comprising valve means operative according to the pressure of fluid supplied thereto to effect an application of the brakes to a degree corresponding to the operating pressure, means providing a chamber, a magnet valve device having a winding and effective when said winding is energized to render said chamber non-effective to receive fluid under pressure supplied to operate the valve means and when said winding is deenergized to render the said chamber effective to receive fluid under pressure supplied to operate the valve means, means actuated in response to the relative movement between sprung and unsprung portions of the vehicle for effecting energization of said winding, means effective when said winding is once energized to thereafter maintain said winding energized to prevent deenergization thereof due to undesired operation of the means responsive to relative movement of the sprung and unsprung portions of the vehicle, and means for rendering said last means non-effective.

13. A vehicle brake equipment comprising valve means operative by fluid under pressure supplied thereto and effective to establish a degree of brake application corresponding to the pressure of the operating fluid, means providing a chamber, a differential magnet valve device having two opposing windings and operative when a certain one only of said windings is energized for rendering said chamber non-effective to receive fluid under pressure supplied to operate the valve means and when said one winding is deenergized to render the said chamber effective to receive fluid under pressure supplied to operate the valve, means effective to cause energization of said one winding as long as the load on the vehicle exceeds a certain load, and means under the control of a vehicle door for effecting energization of the other of said windings to cause operation of the magnet valve device to render the chamber effective to receive fluid under pressure supplied to operate the valve means notwithstanding that the load on the vehicle exceeds said certain load.

14. A vehicle brake equipment comprising valve means operative upon the supply of fluid under pressure thereto to establish a degree of brake application corresponding to the pressure of the operating fluid, means providing a chamber, a differential magnet valve device having two opposing windings, a circuit on which one of said windings operates, means responsive to the load on the vehicle effective when the load exceeds a certain value for completing said circuit to effect energization of said one winding, said magnet valve being operated to render the said chamber non-effective to receive fluid under pressure supplied to operate the valve means when said one winding only is energized, a holding circuit for maintaining the said one winding energized independently of the interruption of the first said circuit by the load-responsive device, switch means operative to establish said holding circuit when the magnet valve is operated to render said chamber non-effective to receive fluid under pressure, a normally open circuit on which the other of said windings operates, and means under the control of a vehicle door for completing the last said circuit to energize the other of said windings as long as the first said circuit or said holding circuit is completed, said magnet valve device being operated when both the windings are energized or deenergized to render the said chamber effective to receive fluid under pressure supplied to operate the valve means.

15. A vehicle brake equipment comprising valve means operative in response to the pressure of fluid supplied thereto to establish a degree of brake application corresponding to the pressure of the operating fluid, means providing a chamber, a magnet valve device having a winding and effective when said winding is deenergized to render the said chamber effective to receive fluid under pressure supplied to operate the valve means and when the winding is energized to render the said chamber non-effective to receive fluid under pressure supplied to operate the valve means, thereby varying the effective pressure of a given quantity of fluid under pressure supplied to operate the valve means, a circuit for energizing said winding, switch means controlled by operation of the vehicle door, switch means controlled according to the load on the vehicle, said two switch means being jointly effective to control said circuit.

16. A vehicle brake equipment comprising valve means operative in response to the pressure of fluid supplied thereto to establish a degree of brake application corresponding to the pressure of the operating fluid, means providing a chamber, a magnet valve device having a winding and operative when the winding is deenergized to render said chamber effective to receive fluid under pressure supplied to operate the valve means and when the winding is energized to render the said chamber non-effective to receive fluid under pressure supplied to operate the valve means whereby to vary the effective pressure of a given quantity of fluid supplied to operate the valve means, a circuit for energizing said winding including a switch device controlled by operation of a vehicle door and a switch device controlled by the load on the vehicle, a holding circuit for maintaining said winding energized, once the first said circuit is established, notwithstanding the subsequent interruption of the first said circuit, and switch means operative to establish said holding circuit when said winding is first energized.

17. A vehicle brake equipment comprising valve means operative in response to the pressure of fluid supplied thereto to establish a degree of brake application corresponding to the pressure of the operating fluid, means providing a chamber, a magnet valve device having a winding and operative when the winding is deenergized to render said chamber effective to receive fluid under pressure supplied to operate the valve means and when the winding is energized to render said chamber non-effective to receive fluid under pressure supplied to operate the valve means whereby to vary the effective pressure of a given quantity of fluid supplied to operate the valve means, a switch device operative in response to variations in load on the vehicle, a second switch device controlled by movement of a vehicle door, said switch devices being jointly effective to cause energization of said winding, and a third switch device in shunt relation to the door-controlled switch device effective jointly with the load responsive switch device when the winding is once energized for maintaining said winding energized thereafter notwithstanding the operation of the door-controlled switch device to a position for effecting deenergization of the winding.

18. An empty and load vehicle brake equipment comprising valve means operative in response to the pressure of fluid supplied thereto to establish a degree of brake application corresponding to the operating pressure, means providing a chamber, a magnet valve device having a winding and operative when said winding is deenergized to render the said chamber effective to receive fluid under pressure supplied to operate the valve means and when the winding is energized to render the said chamber non-effective to receive fluid under pressure supplied to operate the valve means whereby to vary the effective pressure of a given quantity of fluid under pressure supplied to operate the valve means, a circuit for energizing said winding, two switch devices jointly effective to control said circuit, one of said switch devices being effective to cause completion of said circuit only when a vehicle door is in open position and the other of said switch devices being effective to cause completion of said circuit only when the load on the vehicle exceeds a certain load, a holding circuit for maintaining said winding energized notwithstanding the interruption of the first said circuit, said holding circuit being controlled jointly by the load controlled switch device and a third switch device which is operated to circuit-closing position upon energization of said winding.

19. An empty and load vehicle brake equipment comprising valve means operative in response to the pressure of fluid supplied thereto to effect an application of the brakes to a degree corresponding to the operating pressure, means providing a chamber, a magnet valve device having a winding and effective when the winding is deenergized to render the said chamber effective to receive fluid under pressure supplied to operate the valve means and when the winding is energized to render said chamber non-effective to receive fluid under pressure supplied to operate the valve means thereby to vary the effective pressure of a given quantity of fluid supplied to operate the valve means, a circuit for energizing said winding, two switch devices effective jointly when both are simultaneously in circuit-closing position to cause completion of said circuit and energization of said winding, one of said switch devices being actuated to circuit-closing position only when a vehicle door is in open position, the other of said switch devices being actuated to circuit-closing position only when the load on the vehicle exceeds a certain load, a holding circuit for maintaining the said winding energized notwithstanding subsequent interruption of the first said circuit, switch means operative to a circuit-closing position when said winding is energized for completing said holding circuit as long as the said load-controlled switch device is in circuit-closing position, and a second switch means connected in shunt relation to the load-controlled switch device and actuated to closed position when the vehicle door is shifted to closed position for maintaining said holding circuit notwithstanding the accidental opening of the load-controlled switch device.

20. An empty and load vehicle brake equipment comprising valve means operative in response to the pressure of fluid supplied thereto to establish a degree of brake application corresponding to the operating pressure, means providing a chamber, a valve device operative to open or close a communication through which fluid under pressure supplied to operate the valve means flows to said chamber so as to vary the effective pressure of a given quantity of fluid supplied to operate the valve means, means controlled according to the load of the vehicle for controlling the operation of said valve device, and means controlled by the position of a vehicle door for rendering the load-controlled means effective or non-effective to control the operation of said valve device.

21. An empty and load vehicle brake equipment comprising valve means operative in response to the pressure of fluid supplied thereto to establish a degree of brake application corresponding to the operating pressure, means providing a chamber, a magnet valve device having a winding and effective when said winding is de-energized to render the said chamber effective to receive fluid under pressure supplied to operate the valve means, and when the said winding is energized to render the said chamber non-effective to receive fluid under pressure supplied to operate the valve means whereby to vary the effective pressure of a given quantity of fluid supplied to operate the valve means, a circuit for energizing said winding, a switch device controlled by operation of a vehicle door and actuated to complete said circuit and energize said winding whenever the door is in open position, a holding circuit for maintaining said winding energized when the first said circuit is interrupted by operation of the vehicle door to closed position, and means for establishing said holding circuit only when the load on the vehicle exceeds a certain load.

22. An empty and load vehicle brake equipment comprising valve means operative in response to the pressure of fluid supplied thereto to establish a degree of brake application corresponding to the operating pressure, means providing a chamber, a magnet valve device having a winding and effective when said winding is de-energized to render the said chamber effective to receive fluid under pressure supplied to operate the valve means and when the said winding is energized to render the said chamber non-effective to receive fluid under pressure supplied to operate the valve means whereby to vary the effective pressure of a given quantity of fluid supplied to operate the valve means, a circuit for energizing said winding, a switch device controlled by operation of a vehicle door and actuated to complete said circuit and energize said winding whenever the door is in open position, a holding circuit for maintaining said winding energized when the first said circuit is interrupted by operation of the vehicle door to closed position, a switch device effective to establish said holding circuit, and means controlled by the load on the vehicle for causing actuation of said switch device to establish said holding circuit only when the load on the vehicle exceeds a certain load.

23. An empty and load vehicle brake equipment comprising valve means operative in response to the pressure of fluid supplied thereto to establish a degree of brake application corresponding to the operating pressure, means providing a chamber, a magnet valve device having a winding and effective when said winding is de-energized to render the said chamber effective to receive fluid under pressure supplied to operate the valve means and when the said winding is energized to render the said chamber non-effective to receive fluid under pressure supplied to operate the valve means whereby to vary the effective pressure of a given quantity of fluid supplied to operate the valve means, a circuit for energizing said winding, a switch device controlled by operation of a vehicle door and actuated to complete said circuit and energize said winding whenever the door is in open position, a holding circuit for maintaining said winding energized when the first said circuit is interrupted by operation of the vehicle door to closed position, a switch device effective to establish said holding circuit, means controlled by the load on the vehicle for causing actuation of said switch device to establish said holding circuit only when the load on the vehicle exceeds a certain load, and means effective when the vehicle door is in closed position to maintain the said switch device in position to complete the holding circuit notwithstanding operation of the load-controlled means to effect interruption of the holding circuit.

24. An empty and load vehicle brake equipment comprising valve means operative in response to the pressure of fluid supplied thereto to effect application of the brakes to a degree corresponding to the operating pressure, means providing a chamber, a magnet valve device having a winding and effective when the winding is de-energized to render said chamber effective to receive fluid under pressure supplied to operate the valve means and when the winding is energized to render the pressure chamber non-effective to receive fluid under pressure supplied to operate the valve means whereby to vary the effective pressure of a given quantity of fluid supplied to operate the valve means, a switch device effective whenever a vehicle door is in open position to effect energization of the said winding, and means effective upon an increase of the load on the vehicle above a certain degree while the door is open for thereafter maintaining said winding energized notwithstanding the opening of the said switch device in response to the closing of the vehicle door.

25. An empty and load vehicle brake equipment comprising valve means operative in response to the pressure of fluid supplied thereto to effect application of the brakes to a degree corresponding to the operating pressure, means providing a chamber, a magnet valve device having a winding and effective when the winding is de-energized to render the said chamber effective to receive fluid under pressure supplied to operate the valve means and when the winding is energized to render the said chamber non-effective to receive fluid under pressure supplied to operate the valve means whereby to vary the effective pressure of a given quantity of fluid supplied to operate the valve means, a switch device effective only when a door on the vehicle is in open position for effecting energization of said winding, a second switch device actuated to closed position only when the load on the vehicle exceeds a certain load, and an electric relay controlled jointly by the said switch devices for establishing a holding circuit to maintain the said winding energized notwithstanding operation of the first said switch device in response to closing of the vehicle door.

26. In a vehicle brake system, in combination, an electrical device operable to control the degree of application of the brakes according to a balanced or an unbalanced electrical condition therein, a car door having a closed and an open position, and means controlled jointly by the position of the car door and the load on the car for controlling the balanced and unbalanced electrical condition of said electrical device.

JOHN J. SINCLAIR.
SAMUEL L. WILLIAMS.